UNITED STATES PATENT OFFICE.

ALPHONSE GILDEMEISTER, OF PARIS, FRANCE.

PROCESS FOR THE TREATMENT OF ORES OF VANADIUM.

1,415,028.  Specification of Letters Patent.  Patented May 9, 1922.

No Drawing.  Application filed December 22, 1921. Serial No. 524,286.

*To all whom it may concern:*

Be it known that I, ALPHONSE GILDEMEISTER, engineer, citizen of the French Republic, residing at Paris, Department of the Seine, in France, and having P. O. address 17 Rue Theodore de Banville, in the said city, have invented certain new and useful Improvements in Processes for the Treatment of Ores of Vanadium, (for which application has been filed in France Dec. 17, 1920;) and I do hereby declare the following to be a full, clear, and exact description of the invention, such as will enable others skilled in the art to which it appertains to make and use the same.

The object of this invention is a process for the treatment of ores of vanadium based upon the formation and separation of vanadium oxychloride, and the production of pure vanadic anhydride from the said oxychloride.

According to this invention, ores containing vanadium in the state of vanadic anhydride, either as found in nature or after a preliminary oxidizing roasting, which brings the vanadium to the maximum degree of oxidation ($V_2O_5$) are treated, in the manner hereinafter described, with dry chloride in the presence of a reducing agent to yield vapors of vanadium oxychloride which, when brought to a concentrated solution, evaporated and exposed to an oxidizing roast, again yield vanadic anhydride, but now in a pure state.

The following description gives an example of the process:—

Ores containing vanadium, either in the natural state as $V_2O_5$, more or less pure, or brought to this condition of maximum oxidation by an oxidizing roast, are in the first place finely powdered, then exposed to the action of perfectly dry and concentrated chlorine in the presence of a suitable reducing agent while heated. This latter may be carbon, which is intimately mixed with the ore, or a reducing gas such as carbon monoxide. It has, however, been found to be especially advantageous to employ chlorine charged with a certain proportion of vapor of sulphur chloride to form vanadium oxychloride ($VO Cl_3$) and sulfur dioxid.

The vapors of vanadium oxychloride (vanadyl trichloride), which are evolved at the temperature at which the operation is carried out, and which should be above the boiling point of this compound (about 126°), are then brought in contact with water in an absorbing device, such as a column. Under the action of the water a concentrated solution containing vanadyl trichloride is obtained, which after evaporation to dryness and subsequent oxidizing roast, yields very pure vanadic anhydride.

The metals associated with the vanadium in these ores, viz., lead, zinc, copper, iron, etc., are also converted by this chlorinating process into chlorides with the production of heat which much facilitates the primary reaction desired, such as

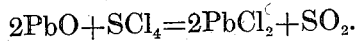

$$2PbO + SCl_4 = 2PbCl_2 + SO_2.$$

The conversion of these metals into chlorides much facilitates their subsequent extraction and separation. But the great difference in volatility, which exists between vanadyl trichloride (boiling point about 126) and the chlorides of the heavy metals contained in the ores, renders a commercially complete separation possible. The same separation will be obtained by the same process in the case of uranium and the rare metals, which are associated with the vanadium, the chlorides of which have boiling points very close to that of vanadyl trichloride. Thus by fractional distillation, in the reaction furnace, and by the aid of a dust-depositing chamber, the separation is easy.

Owing to the very exact separation attained, there results on the one hand a very pure vanadic anhydride and on the other a residue containing only traces of vanadium.

The reaction of the chlorine on the ore can be carried out in any suitable apparatus which allows of intimate contact between the ore and the chlorine gas. This apparatus should be provided with heating means. It has been found that it is especially convenient to operate in a horizontal iron rotary retort, externally heated. This cylinder is lined inside with refractory material not acted upon by chlorine. The gas enters by a central nozzle, and the products of the reaction escape by a nozzle at the opposite end. The length of the retort and its speed of rotation should be such that when the ore material is heated to a temperature of 300° to 400°, (considered as most advantageous for the reaction) the reaction may be completed at the end of the retort opposite to the chlorine inlet.

The vapors of vanadium chloride before being decomposed by the water are freed from impurities by passing through a dust depositing chamber suitably heated, (i. e. held at above 126° C.,) or by any other method such as filtration, centrifugal action, precipitation by high tension current or the like.

I claim,

1. A process of producing vanadium compounds from ores, which comprises exposing such ores while containing $V_2O_5$ to the action of dry chlorine, in the continued presence of a reducing agent, while at substantially above the boiling point of vanadyl trichlorid, but not substantially above 400° C, whereby the vanadyl trichlorid distills alone, and subsequently collecting the latter.

2. A process which consists in subjecting vanadium ores containing the vanadium in the state of oxidation represented by the formula $V_2O_5$ with chlorine in the presence of sulphur chloride, and in the continued presence of a reducing agent, maintaining the ore material at a temperature between 126 and 400° C., and collecting the vanadyl trichloride so evolved.

In testimony whereof I affix my signature.

ALPHONSE GILDEMEISTER.